United States Patent [19]

Froutzis

[11] Patent Number: 4,895,338
[45] Date of Patent: Jan. 23, 1990

[54] RELEASABLE ANCHOR FOR VEHICLE SEATS

[76] Inventor: Andrew Froutzis, P.O. Box 4110, Elkhart, Ind. 46514

[21] Appl. No.: 291,217

[22] Filed: Dec. 27, 1988

[51] Int. Cl.$^4$ ............................................. F16M 13/00
[52] U.S. Cl. .................................. 248/503.1; 248/74.1
[58] Field of Search .................. 248/503.1, 74.1, 74.4, 248/231.5, 231.6

[56] References Cited

U.S. PATENT DOCUMENTS

| | | | |
|---|---|---|---|
| 3,765,629 | 10/1973 | Voelker et al. | 248/74.4 |
| 4,029,276 | 6/1977 | Zielie | 248/74.1 |
| 4,595,164 | 6/1986 | Frontzis et al. | 248/74.4 X |
| 4,624,374 | 11/1986 | Murtaugh | 211/60.1 |
| 4,799,444 | 1/1989 | Lisowski | 248/74.4 X |

FOREIGN PATENT DOCUMENTS

| | | | |
|---|---|---|---|
| 264007 | 4/1988 | European Pat. Off. | 248/74.1 |
| 2310170 | 9/1974 | Fed. Rep. of Germany | 248/74.4 |
| 306165 | 6/1955 | Switzerland | 248/74.4 |
| 13950 | of 1912 | United Kingdom | 248/74.1 |
| 827197 | 2/1960 | United Kingdom | 248/74.4 |

*Primary Examiner*—Ramon S. Britts
*Assistant Examiner*—Karen J. Chotkowski
*Attorney, Agent, or Firm*—Thomas J. Dodd

[57] ABSTRACT

An anchor for releasably securing a seat to the floor of a vehicle. The anchor includes a base having spaced channels and an anchor member having a channel part and guide aligned with the base member channels to house the seat tubular frame and provide support against upward relative movement of the base and anchor.

2 Claims, 1 Drawing Sheet

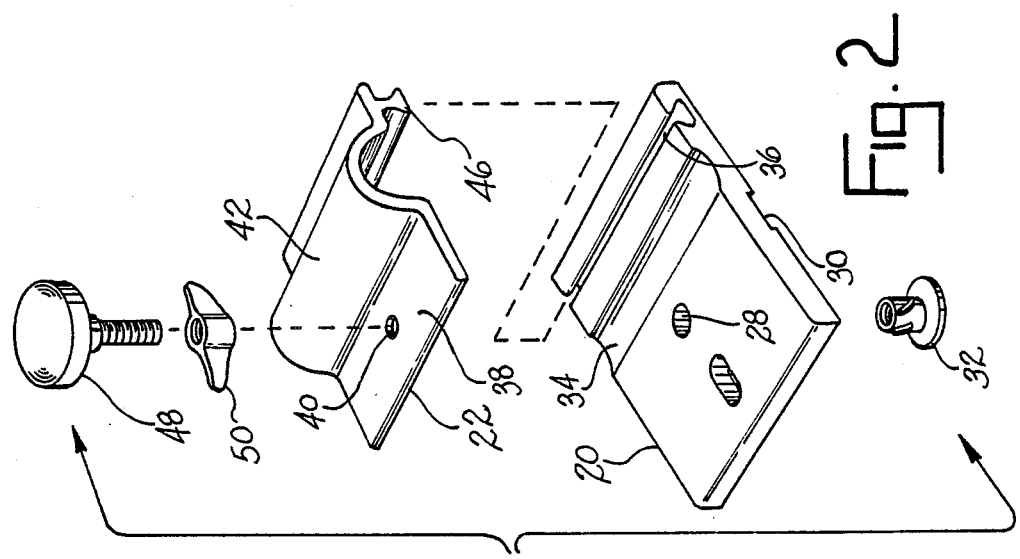
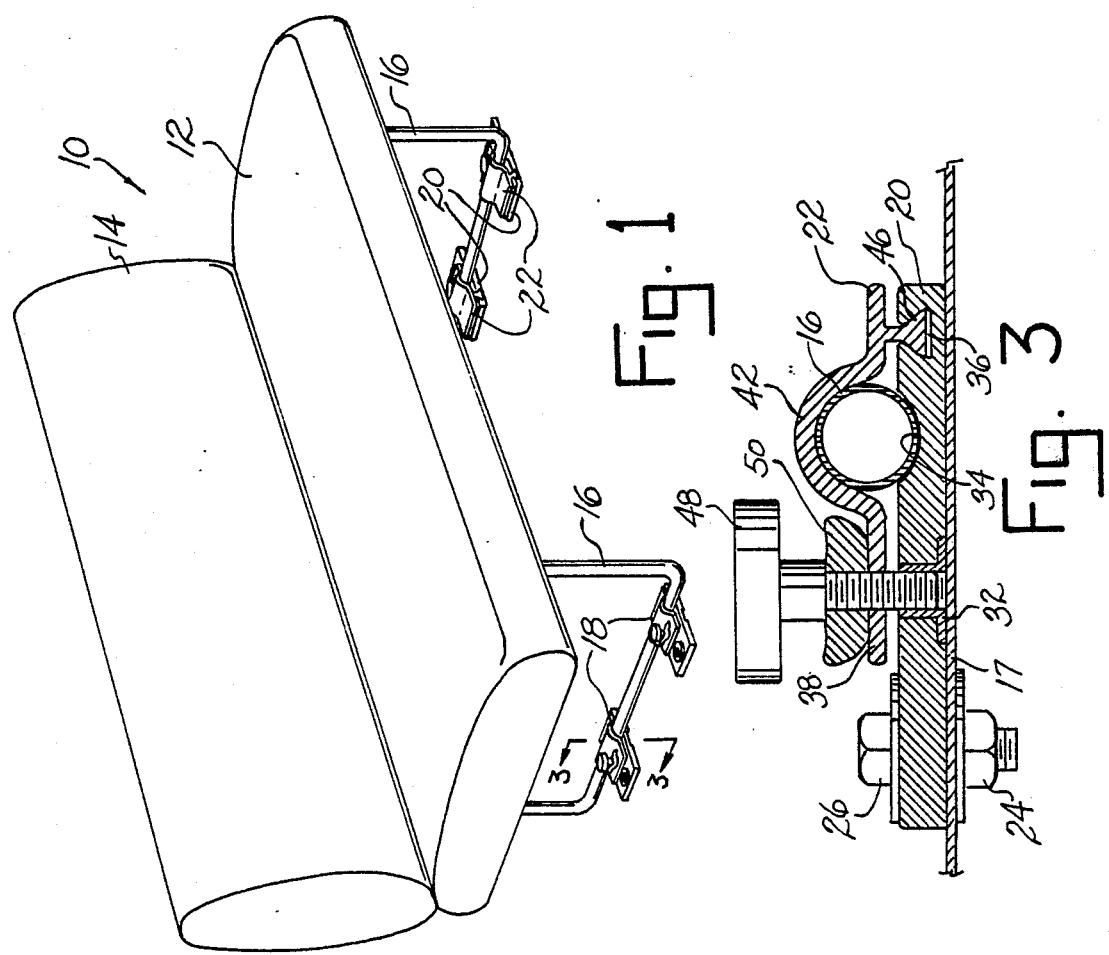

RELEASABLE ANCHOR FOR VEHICLE SEATS

SUMMARY OF THE INVENTION

This invention relates to seat anchors and will have application to anchors for releasably securing vehicle seats to the floors.

The present invention discloses a releasable seat anchor which secures a seat to the floor of a vehicle such as a van. Another such anchor is shown in my U.S. Pat. No. 4,595,164, and serves to allow a vehicle owner to rapidly install or remove the seat to adapt the vehicle for various uses.

The seat anchor includes a base member secured to the vehicle floor and a removable anchor member. The base and anchor together define a channel for enclosing a depending support tube of the seat and also include a separate guide and channel arrangement for sliding the anchor member into and out of engagement with the base.

Accordingly, it is an object of this invention to provide for an improved removable vehicular seat anchor.

Another object is to provide a seat anchor in which the anchor member may slide on and off the base during installation and removal.

Another object is to provide a novel seat anchor which is efficient, durable and economical.

Other objects will become apparent upon a reading of the following description.

BRIEF DESCRIPTION OF THE DRAWINGS

A preferred embodiment of the invention has been depicted for illustrative purposes wherein:

FIG. 1 is a perspective view of the seat anchor securing a vehicle seat to a vehicle floor.

FIG. 2 is an exploded view of the anchor.

FIG. 3 is a sectional view taken along line 3—3 of FIG. 1.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to thereby enable others skilled in the art to utilize the invention.

Referring now to the drawings, reference numeral 10 refers generally to a vehicle seat which includes a seat cushion 12 and back cushion 14 supported by depending U-shaped tubular frame supports 16. Seat 10 is adapted to be secured to the floor 17 of a vehicle (not shown) and is a conventional item offered in conjunction with vans and other recreational vehicles.

Reference numeral 18 refers generally to the anchor shown in FIGS. 1-3. Anchor 18 includes a base member 20 and an anchor member 22. Base member 20 is substantially flat and is secured to floor 17 by fasteners such as nut 24 and bolt 26 combination. Base member 20 has a vertical bore 28 which communicates with lower slot 30 and which accommodates an internally threaded boss 32 as shown in FIG. 3. Base member 18 also defines upper surface channels 34 and 36 as shown.

Anchor member 22 as shown in FIG. 2 includes an outer flange 38 which has a bore 40 aligned with base member bore 28. Anchor member 22 also includes an integral raised channel part 42 which is aligned with base member channel 34 and a downturned guide 46 aligned with channel 36. Guide 46 is shown as generally triangular in cross-sectional configuration but many configurations are possible so long as the guide is both able to slide horizontally along channel 36 and secured within the channel against vertical uplift and removal.

Anchor 18 is utilized as follows to secure seat 10 to floor 17. With base member 20 secured in position to floor 17 by fasteners 24, 26, seat 10 is positioned with the lower edge of tubular frame 16 resting in base member channel 34. It should be noted that one or more anchors 18 are utilized to secure each frame support 16 (four are shown), but, since the operation is identical, only one anchor 18 is described here. Anchor member 22 is then aligned in horizontal spaced relation to base member 20 and guide 46 slid horizontally into base member channel 36 until bores 28, 40 are aligned. A fastener, shown in the drawings as thumbscrew 48 is turned through wing nut 50 and into boss 32 to tighten anchor member 22 into clamping contact with tubular support 16 to secure the tubular support therebetween. To remove the anchors 18 and seat 10 the above process is simply reversed. It should be noted that the configuration of channels 34, 42 will match the configuration of supports 16 which can be round, square, hexagonal or any other accepted configuration.

It is understood that the above description does not limit the invention to its details, but may be modified within the scope of the following claims.

I claim:

1. A bracket for releasably securing a piece of furniture to a vehicle floor, said bracket comprising a base member, means for securing said base member to a vehicle floor, said base member defining a first channel for cradling a depending elongated support tube from a piece of furniture, said base member further defining a second channel generally paralleling said first channel, a depending guide slidably fitted in said second channel, said guide slidable along a longitudinal direction with respect to said elongated support tube and base member, and an anchor member defining a channel part aligned with said first channel to encompass said support tube, said anchor member further including a flange extending from said channel part away from said guide, means extending through said flange into said base member for releasably securing the anchor member to the base member to clamp said support tube therebetween.

2. The bracket of claim 1 wherein said second channel has outwardly tapering walls, said guide having outwardly tapering side walls to restrict upward movement of the guide relative to the base member.

* * * * *